(12) United States Patent
Yotsumoto

(10) Patent No.: US 6,993,344 B2
(45) Date of Patent: Jan. 31, 2006

(54) CDMA WIRELESS BASE STATION

(75) Inventor: Koji Yotsumoto, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 404 days.

(21) Appl. No.: 10/263,668

(22) Filed: Oct. 4, 2002

(65) Prior Publication Data
US 2003/0069044 A1 Apr. 10, 2003

(30) Foreign Application Priority Data
Oct. 9, 2001 (JP) .............................. 2001-310905

(51) Int. Cl.
*H04Q 7/20* (2006.01)

(52) U.S. Cl. ................. 455/452.1; 455/450; 455/509; 370/441; 370/329; 370/342; 370/335; 375/152; 375/143; 375/343

(58) Field of Classification Search ............... 455/509, 455/512, 561, 450, 452.1; 370/329, 342, 370/441, 335, 397, 208, 320; 375/140, 147, 375/152, 142, 143, 343, 362, 368
See application file for complete search history.

(56) References Cited

U.S. PATENT DOCUMENTS

| | | | |
|---|---|---|---|
| 6,442,153 B1 * | 8/2002 | Dahlman et al. ........... 370/342 |
| 6,532,254 B1 * | 3/2003 | Jokinen ....................... 375/148 |
| 6,792,031 B1 * | 9/2004 | Sriram et al. ............... 375/147 |
| 6,792,037 B2 * | 9/2004 | Meyer et al. ............... 375/150 |
| 2002/0024993 A1 * | 2/2002 | Subramanian et al. ...... 375/216 |
| 2002/0054625 A1 * | 5/2002 | Matsumoto et al. ........ 375/152 |
| 2003/0012267 A1 * | 1/2003 | Jitsukawa et al. .......... 375/148 |
| 2004/0081115 A1 * | 4/2004 | Parsa et al. ................. 370/320 |

OTHER PUBLICATIONS

Moberg et al "Throughput of the WCDMA Random Access Channel" Mobile Communication Summit, Gateway, Ireland, Oct. 2000.*

* cited by examiner

Primary Examiner—Edan Orgad
(74) Attorney, Agent, or Firm—McGinn IP Law Group, PLLC

(57) ABSTRACT

Disclosed is a W-CDMA wireless base station adapted to meet various specifications over a wide range to dynamically change the allocated numbers of RACH's and DPCH's depending on a cell radius and the number of Signatures. The W-CDMA wireless base station that performs an optimal channel allocation based on parameters received from an external network, comprises: a preamble detection and path search section adapted to perform an RACH preamble detection in a reception base band signal or perform a path search of the reception base band signal; demodulation section adapted to demodulate the reception base band signal by including therein a plurality of fingers and combining outputs of the fingers; a control section adapted to control said preamble detection and path search section to switch itself either to a preamble detection section or to a path search section so as to change the allocated numbers of RACH's and DPCH's based on the parameters.

1 Claim, 8 Drawing Sheets

| THE CURRENT NUMBER OF DPCH'S | THE NUMBER OF RECEIVABLE CHANNELS (INCLUSIVE OF THE CURRENT NUMBER OF CHANNELS) | |
|---|---|---|
| | RACH | DPCH |
| 0 | 12 | 22 |
| 1 | 12 | 22 |
| 2 | 12 | 22 |
| ⋮ | | |
| 20 | 12 | 22 |
| 21 | 11 | 23 |
| 22 | 10 | 24 |
| ⋮ | | |
| 28 | 4 | 30 |
| 29 | 3 | 31 |
| 30 | 2 | 32 |
| 31 | 2 | 32 |
| 32 | 2 | 32 |

Fig. 9

| CELL RADIUS | THE NUMBER OF SIGNATURES | THE NUMBER OF RACH'S | THE NUMBER OF DPCH'S |
|---|---|---|---|
| 1 km | 16 | 16⇔6 | 22⇔32 |
| 15 km | 16 | 16⇔2 | 16⇔30 |
| | 12 | 12⇔2 | 22⇔32 |
| 50 km | 16 | 16⇔2 | 4⇔18 |
| | 12 | 12⇔2 | 10⇔20 |
| | 8 | 8⇔2 | 18⇔24 |
| | 4 | 4⇔2 | 30⇔32 |
| | 16 | 16⇔2 | 16⇔30 |
| | 6 | 6 | 32 |

Fig. 13    PRIOR ART
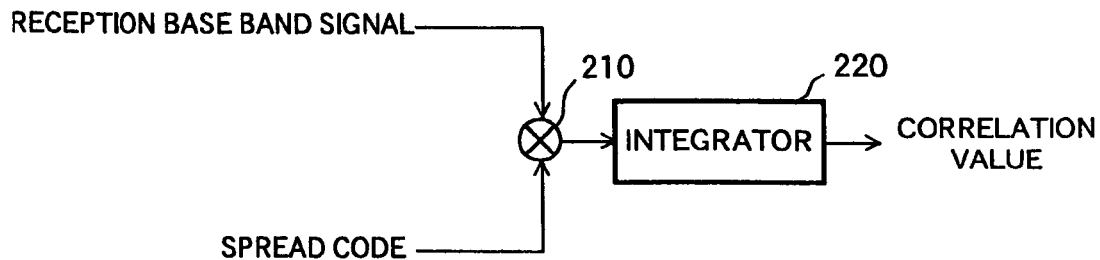
Fig. 14    PRIOR ART
| CELL RADIUS | THE NUMBER OF SIGNATURES | THE NUMBER OF RACH'S | THE NUMBER OF DPCH'S |
|---|---|---|---|
| 15 km | 8 | 4 | 32 |

CDMA WIRELESS BASE STATION

BACKGROUND OF THE INVENTION

1. Field of the Invention

The present invention relates to a W-CDMA wireless base station adapted to perform an optimal channel allocation for example in a CDMA mode wireless communication system including a W-CDMA (Wideband-Code Division Multiple Access) mode.

2. Description of the Related Art

FIG. 10 is a schematic block diagram showing a configuration example of a high frequency section and a base band section in a convention W-CDMA wireless base station. Operations and configurations of the respective high frequency and the base band sections of this convention W-CDMA wireless base station are as follows:

In a transmission operation, a transmission data is modulated via a modulation section 10 and then multiplied by a spread code at a spread section 20 so as to output as a transmission base band signal to the high frequency section 30. The high frequency section 30 converts the transmission base band signal into a transmission high frequency signal to output to an antenna 40. That is, this transmission high frequency signal is transmitted via the antenna 40 outwardly.

In a reception operation, a reception high frequency signal is received by the antenna 40 and outputted to the high frequency section 30. Then, the high frequency section 30 converts the reception high frequency signal into a reception base and signal and then outputs it in parallel to a preamble detection section 50, a path search section 60, a DPCH (Dedicated Physical Channel) demodulation section 70 and RACH (Random Access Channel) demodulation section 80. It should be noted that the DPCH is a separate channel while the RACH is a common channel.

The base band section of the conventional W-CDMA wireless base station generally comprises a plurality of the preamble detection sections 50 and a plurality of the path search sections 60. FIG. 11 is a schematic block diagram showing a configuration example of the conventional base band section comprising the plural preamble detection sections and the plural path search sections. As shown in FIG. 11, there are provided three preamble detection sections 50A–50C for example each having a similar configuration to that of the preamble detection section 50 and three path search sections 60A–60C for example each having a similar configuration to that of the path search section 60.

First of all, the preamble detection section 50 and the path search section 60 will be described with reference to FIGS. 10–12. As shown in FIG. 10, the preamble detection section 50 is comprised of a matched filter 51 and a detection portion 52 while the path search section 6 is comprised if a matched filter 61 and a detection portion 62. FIG. 12 is a schematic block diagram showing a configuration example of a conventional matched filter used as the matched filter 51 or 61. The conventional matched filter, as shown in FIG. 12, is comprised of shift registers 110, multipliers 120 and an adder 130. In this case of FIG. 12, the number of taps is n+1. There are provided n shift registers 110 which are adapted to serially shift an inputted reception base band signal thereover. Also, there are provided n+1 multipliers 120 which are each adapted to perform a multiplication of the reception base band signal which has been shifted serially and outputted from its corresponding tap and a spread code. In addition, the adder 130 is adapted to add outputs from all of the multipliers 120 and output the obtained result as a correlation value.

The matched filter 51 of the preamble detection section 50 performs a correlative operation of the reception base band signal and the spread code For acquiring a preamble of an RACH, and then outputs the result as a correlation value to the detector 52. Then, the detector 52 performs a detection of the preamble by using that correlation value. In this example, a DSP (Digital Signal Processor) is used as the detector 52.

On the other hand, the matched filter 61 of the pat search section 60 performs a correlative operation of the reception base band signal and the spread code for acquiring a path, and then outputs the result as a correlation value to the detector 62. The, the detector 62 performs a detection of the path by using that correlation value. In this example, a DSP (Digital Signal Processor) is used as the detector 56.

Turning again to FIG. 10, the DPCH demodulation section 70 comprises a plurality of fingers 71 and a RAKE portion 72 while the RACH demodulation section 80 comprises a plurality of fingers 81 and a RAKE portion 82. FIG. 13 is a schematic block diagram showing a configuration example of a convention finger 71 or 81. As shown in FIG. 13, the fingers 71 or 81 are each comprised of a multiplier 210 and an integrator 220. The multiplier 210 performs a multiplication of the reception base band signal and a spread code. The integrator 220 integrates outputs from the multiplier 210 and then outputs the result as a correlation value.

According to the output from the path search section 60, a spread code is inputted to each of the plurality of fingers 71 for each path per DPCH. Each finger 71 performs a correlative operation of the inputted spread code and the reception base band signal and then outputs the result as a correlation value to the RAKE portion 72. The RAKE portion 72 combines (or synthesizes) correlation values from the plurality of fingers 71 by using RAKE and demodulates it, thereby outputting the demodulated signal as a reception data.

On the other hand, a spread code is inputted to each of the plurality of fingers 81 for each path per DPCH according to the output from the path search section 60. Each finger 81 performs a correlative operation of the inputted spread code and the reception base band signal and then outputs the result as a correlation value to the RAKE portion 82. The RAKE portion 82 combines correlation values from the plurality of fingers 81 by using RAKE and demodulates it, thereby outputting the demodulated signal as a RACH data.

The high frequency section and the base band section of the conventional W-CDMA wireless base station as described above are designed to perform a channel allocation according to a fixed specification. FIG. 14 is a table showing a specification example of the channel allocation performed in the conventional W-CDMA wireless base station. Namely, the high frequency section and the base band section of the conventional W-CDMA wireless base station is designed to perform the channel allocation according to the fixed specification, for example, as shown in FIG. 14, in which a cell radius is 15 Km, the number of Signatures available for RACH is 8, the number of RACH's are provided for 8 channels and the number of DPCH's are provided for 32 channels.

However, it is desired, upon an actual operation of the W-CDMA wireless base station, to change over the cell radius, the number of Signature and the like depending on the location for installation thereof. Also, the RACH, which is the common channel, is used for a packet communication during few traffic and readily assumed to be often used in a portable telephone equipped with a browser function. It can be assumed that the DPCH having a more traffic such as a high-speed data communication is sometimes occurred. Therefore, it is desired to sufficiently meet change in the numbers of RACH's and/or the DPCH's. In order to overcome these difficulties, it is needed to design a W-CDMA wireless base station capable of meeting every specification. However, such a W-CDMA wireless base station will have to include a significant amount of redundancy and then requires a large scale circuitry.

Hence, in order to address the above-mentioned problems, an object of the present invention is to provide a CDMA wireless base station which is able to meet various specifications over a wide range, i.e., capable of dynamically changing an allocation of the number of RACH's and/or DPCH's depending on the cell radius and the number of Signatures, thereby enabling its circuit scale to be reduced.

SUMMARY OF THE INVENTION

According to an aspect of the present invention, there is provided a CDMA wireless base station that performs a channel allocation based on parameters externally received, characterized by comprising: a preamble detection and path search section adapted to perform a preamble detection in a reception base band signal or perform a path search of the reception base band signal; demodulating means for demodulating the reception base band signal; and controlling means for controlling said preamble detection and path search section to function either as a preamble detection section or as a path search section.

According to another aspect of the present invention, the CDMA wireless base station as described above is characterized in that said preamble detection and path search section comprises a plurality of matched Filters, in the event that said controlling means controlling said preamble detection and path search section to function as the preamble detection section said plurality of matched filters are connected serially, and in the event that said controlling means controlling said preamble detection and path search section to function as the path search section said plurality of matched filters are each used to acquire a different channel from the others.

With the configuration thus constructed, it is possible to meet various specifications over a wide range and dynamically change the allocated numbers of RACH's and DPCH's depending on the cell radius and the number of Signatures.

In addition, the W-CDMA wireless base station that performs an optimal channel allocation based on parameters received from an external network, comprises: a preamble detection and path search section adapted to perform an RACH preamble detection in a reception base band signal or perform a path search of the reception base band signal; demodulating means for demodulating the reception base band signal by including therein a plurality of fingers and combining outputs of the fingers; controlling means for controlling said preamble detection and path search section to switch itself either to a preamble detection section or to a path search section so as to change the allocated numbers of RACH's and DPCH's based on the parameters. Also, the preamble detection and path search section comprises a plurality of compact-sized filters, and the controlling means is characterized by arranging the plurality of compact-sized filters to be mutually connected serially depending on the preamble and a length of spread code or arranging the plurality of compact-sized filters to be connected in parallel depending on the number of channels.

Further, in the W-CDMA wireless base station, the controlling means is characterized by arranging the plurality of compact-sized matched filters based on the parameters and changing a window size of the path search. With the configuration thus constructed, the compact-sized matched filters are switchable efficiently and each usable for dual-purpose, thereby enabling the circuitries to be substantially downsized.

Furthermore, in the W-CDMA wireless base station, the controlling means is characterized by arranging the plurality of fingers based on the parameters and changing the number of fingers for each channel. With the configuration thus constructed, the fingers are switchable efficiently and each usable for dual-purpose, thereby enabling the circuitries to be substantially downsized.

These and other aspects of the present invention will be apparent from the following specific description, given by way of example, with reference to the accompanying drawings.

BRIEF DESCRIPTION OF THE DRAWINGS

FIG. 9 is a table showing a specification example of a channel allocation performed in the W-CDMA wireless base station;

FIG. 13 is a schematic block diagram showing a configuration example of a convention finger; and FIG. 14 is a table showing a specification example of a channel allocation performed in the conventional W-CDMA wireless base station.

DESCRIPTION OF PREFERRED EMBODIMENTS

Hereinafter, a preferred embodiment according to the present invention will be described in the form of a wireless base station using a W-CDMA mode with reference to the accompanying drawings.

Figure 1:
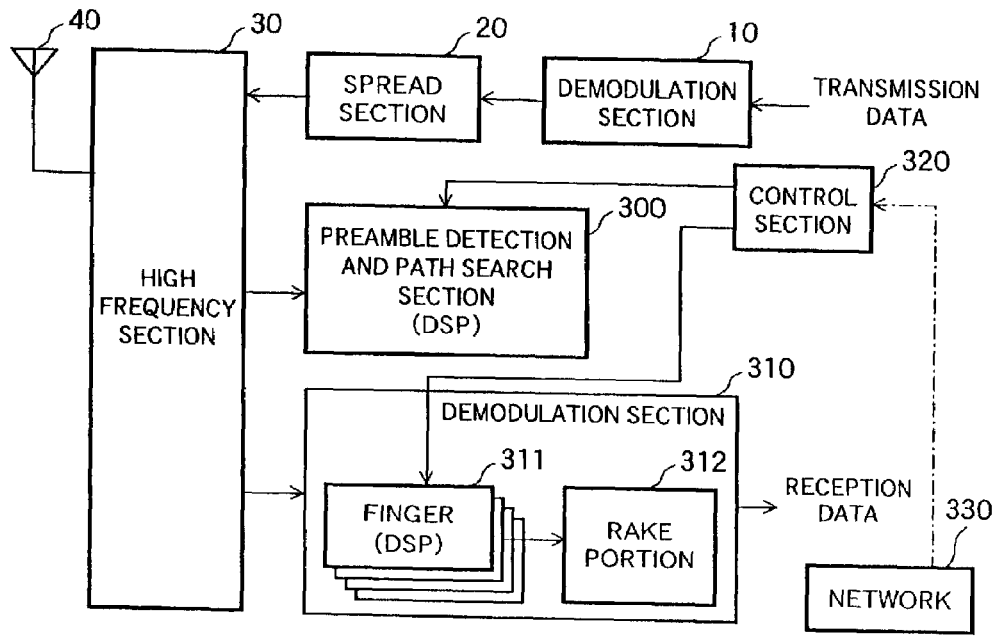
FIG. 1 is a schematic block diagram showing a configuration example of a high frequency section and a base band section provided in a W-CDMA base station of a preferred embodiment according to the present invention.
Figure 10:
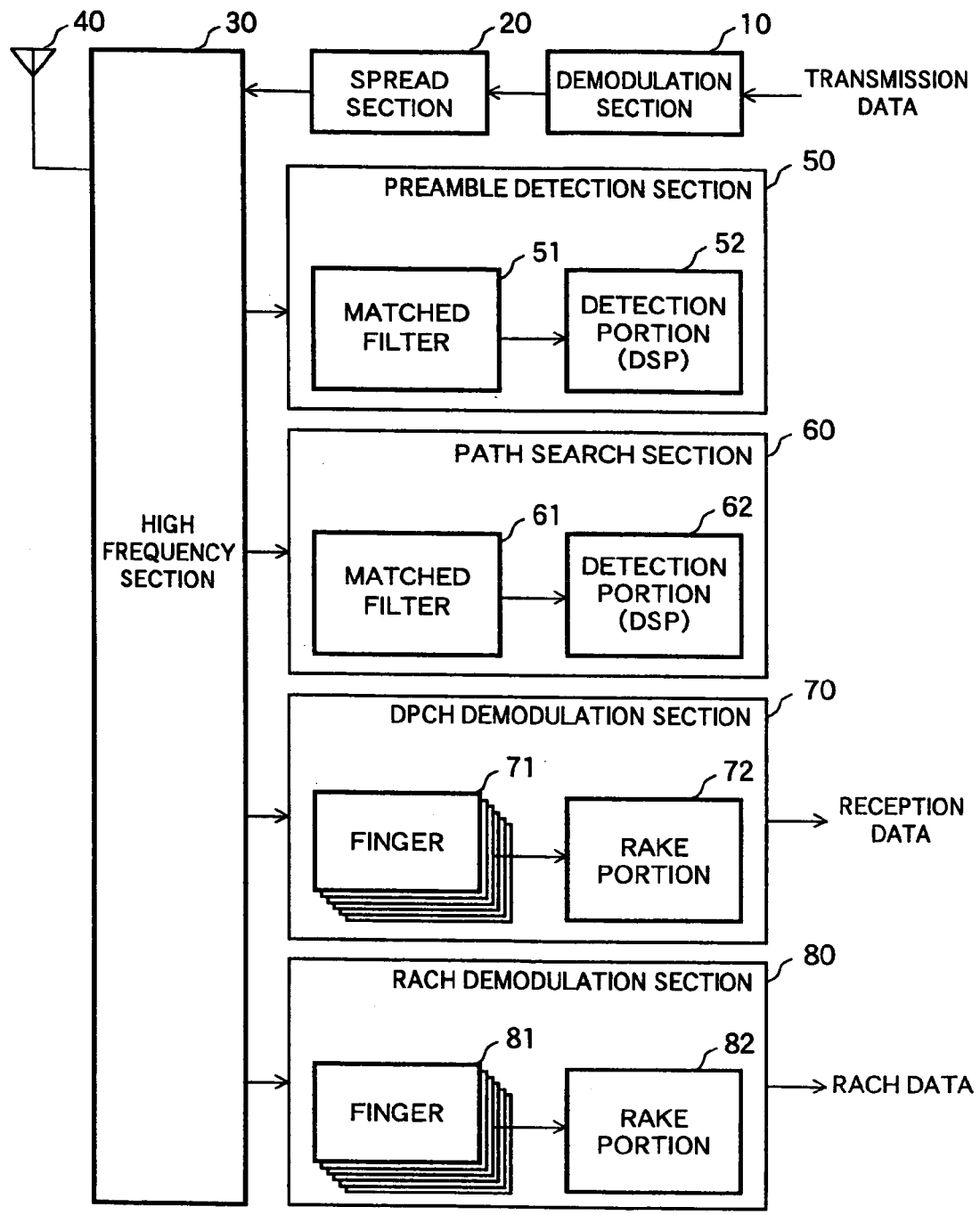
FIG. 10 is a schematic block diagram showing a configuration example of a high frequency section and a base band section in a convention W-CDMA wireless base station.

FIG. 1 is a schematic block diagram showing a configuration example of a high frequency section and a base band section provided in a W-CDMA wireless base station of the preferred embodiment. In this FIG. 1, similar reference numerals to those of FIG. 10 are used to identify similar sections and/or parts. Therefore, Explanations regarding those sections and/or parts are omitted from the following description.

The W-CDMA wireless base station as shown in FIG. 1 comprises: a preamble detection and path search section 300 in place of the preamble detection section 50 and the path search section 60 as shown in FIG. 10; and a demodulation section 310 in place of the DPCH demodulation section 70 and the RACH demodulation section 80 as shown in FIG. 10. Only one demodulation section 310 is comprised of a plurality of fingers 311 and a RAKE portion 312. It should be noted that the preamble detection and path search section 300 and fingers 311 use DSP's, respectively, so as to function as a software radio. The W-CDMA wireless base station as shown in FIG. 1 further comprises a control section 320 for controlling the preamble detection and path search section 300 and the fingers 311. This control section 320 performs its control according to a parameter received from an external network 330.

In the wireless base station of this embodiment, the preamble detection and path search section 300 and the fingers 311 are each composed of a DSP, but it may be possible to implement in hardware each of them partially or over all.

It will be appreciated that the demodulation section 310 serves as demodulation means and the control section 320 serves as control means in the present embodiment.

Figure 2:
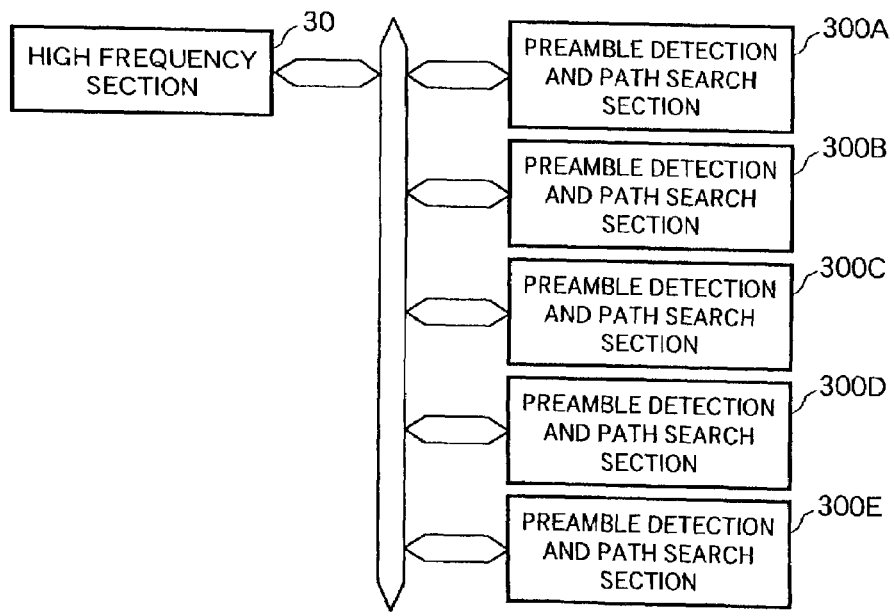
FIG. 2 is a schematic block diagram showing a configuration example of the base band section using plurality of preamble detection and path search sections.

First of all, the following description is provided to explain such an operation of the control section 320 as to change the number of channels to be expropriated depending on a cell radius and the number of Signatures. FIG. 2 is a schematic block diagram showing a configuration example of the base band section using plurality of preamble detection and path search sections. The base band section in the W-CDMA wireless base station according to the present invention comprises a plurality of preamble detection and path search sections 300A to 300E as shown in FIG. 2. It should be noted that each of the preamble detection and path search sections 300A to 300E has a similar configuration to that of the preamble detection and path search section 300.

Figure 11:
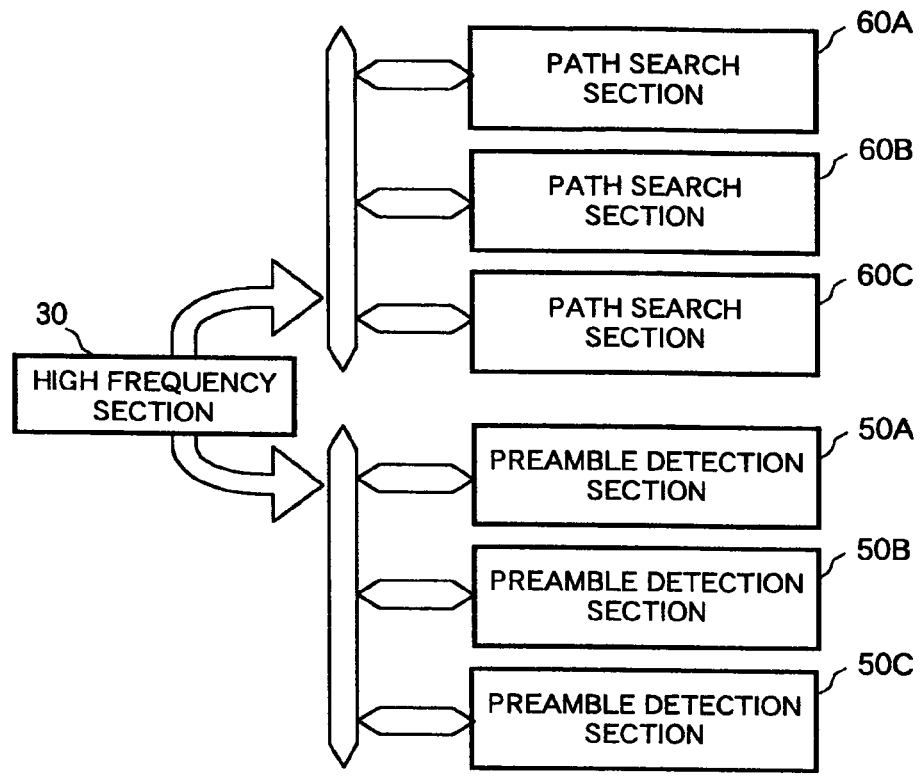
FIG. 11 is a schematic block diagram showing a configuration example of the conventional base band section using a plurality of preamble detection sections and a plurality of path search sections.

In the conventional configuration as shown in FIG. 11, each of the preamble detection sections 50A to 50C is implemented in hardware independent of that for each of the path search sections 60A to 60C. However, the present preferred embodiment according to the present invention employs, instead of the conventional configuration, the preamble detection and path search sections 300A to 300E each of which is in the form of a dual purpose unit for performing both functions of a preamble detection and a path search. Depending on parameters received from an external network 330, the control section 320 enables or switches the preamble detection and path search section 300A to 300E to function either one of the preamble detection and the path search. The parameters received by the control section 320 are the number of Signatures and the cell radius available to the RACH.

For example, if the control section 320 receives parameters of the cell radius being 50 Km and the number of Signatures being 16 from the external network 330, then the control section 320 switches the preamble detection and path search section 300B to 300E to function as preamble detection sections and simultaneously switches the preamble detection and path search section 300A only to function as a path search section in the configuration of FIG. 2. Also, if the control section 320 receives parameters of the cell radius being 15 Km and the number of Signatures being 12 from the external network 330, then the control section 320 switches the preamble detection and path search sections 300A to 300D to function as the path search sections and simultaneously switches the preamble detection and path search section 300E only to function as the preamble detection section in the configuration of FIG. 2.

Figure 12:
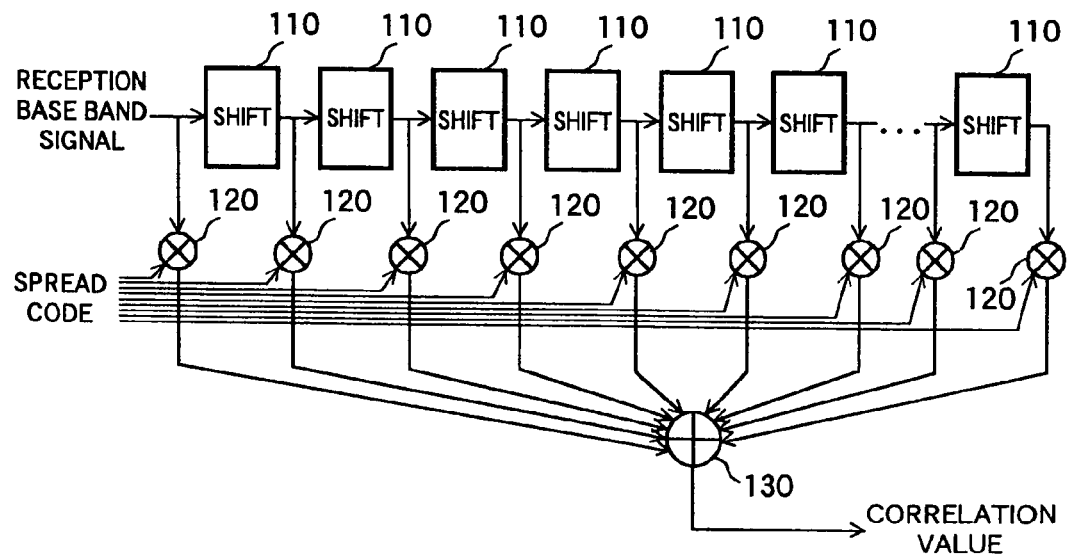
FIG. 12 is a schematic block diagram showing a configuration example of a conventional matched filter.

The following description is provided to explain components of the preamble detection and path search section 300. As described above, the preamble detection and path search section 300 possesses both functions of the preamble detection section 50 and the path search section 60. These conventional preamble detection section 50 and path search section 60 each uses a matched filter as shown in FIG. 12. The preamble detection section is intended as its purpose to acquire a preamble of the RACH so that the number of taps of the matched filter becomes greatly increased. On the other hand, the path search section is intended as its purpose to follow up or trace a path while grasping an approximate path position so that the number of taps of the matched filter can be covered by a size of several tenth of the preamble detection section. Thus, the preamble detection and path search section 300 of the preferred embodiment employs, in place of the matched filter as shown in FIG. 12, a compact-sized matched filter capable of being commonly available to both functions of the conventional preamble detection section 50 and path search section 50.

Figure 3:
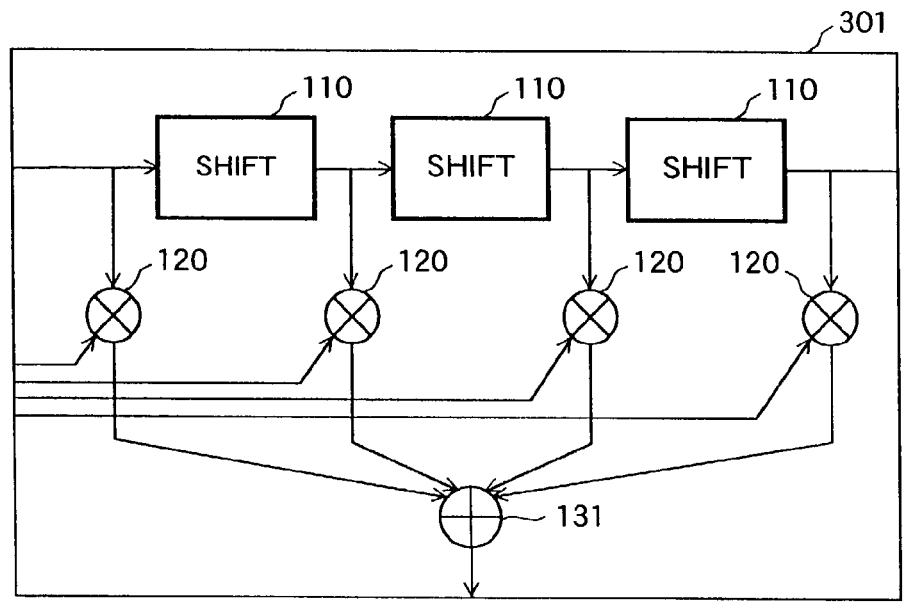
FIG. 3 is a schematic block diagram showing a configuration example of a compact-sized matched filter which is used in a preamble detection and path search section of a preferred embodiment according to the present invention.

Here, a configuration example of the compact-sized matched filter will be described with reference to FIG. 3 as follows. In particular, FIG. 3 is a schematic block diagram showing the configuration example of the compact-sized matched filter which is used in the preamble detection and path search section according to the present invention and which is comprised of three shift registers 110, four multipliers 120 and an adder 131, together with four taps. These three shift registers 110 are adapted to serially shift an inputted reception base band signal thereover. The four multipliers 120 are each adapted to perform a multiplication of the reception base band signal serially shifted and outputted from its corresponding tap and a spread code. The adder 131 is adapted to add outputs from all of the multipliers 120 and output the obtained result as a correlation value.

Figure 4:
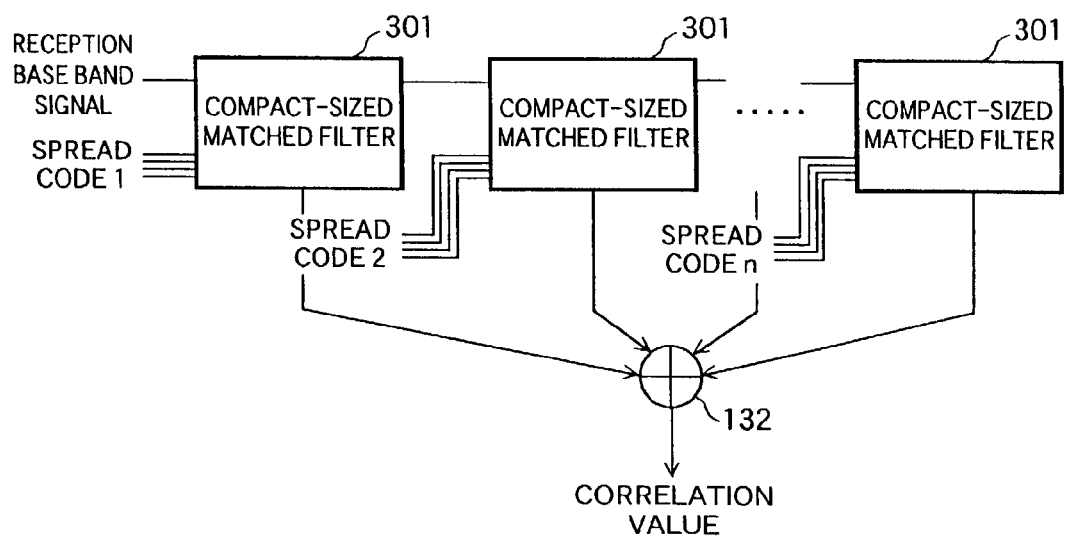
FIG. 4 is a schematic block diagram showing a configuration example of an arrangement of serially-connected compact-sized matched filters.

FIG. 4 is a schematic block diagram showing a configuration example of an arrangement of serially-connected compact-sized matched filters. Since more taps in its number are required in the event that the preamble detection and path search section 300 as shown in FIG. 1 functions as the preamble detection section, the compact-sized matched filters 301 are arranged to be serially connected as shown in FIG. 4. Each of the compact-sized matched filters 301 has a signal input and a reference input. To the signal input of a beginning matched filter 301 is inputted a reception base band signal. The reception base band signal which has been passed through all of the shift registers in the beginning compact-sized matched filter 301 is inputted to the next compact-sized matched filter 301. In a similar manner, the reception base band signal shifted over (or through) that compact-sized 301 is sequentially inputted to the next one. On the other hand, to the reference input of each of the compact-sized matched filters 301 is inputted a partial code which is a part of such a spread code as to acquire a preamble of the same RACH and which is adjusted to share in being shifted over its corresponding compact-sized matched filters 301. The adder 132 is adapted to add outputs from all of the compact-sized matched filters 301 and output the obtained result as a correlation value.

Figures 5, 6:
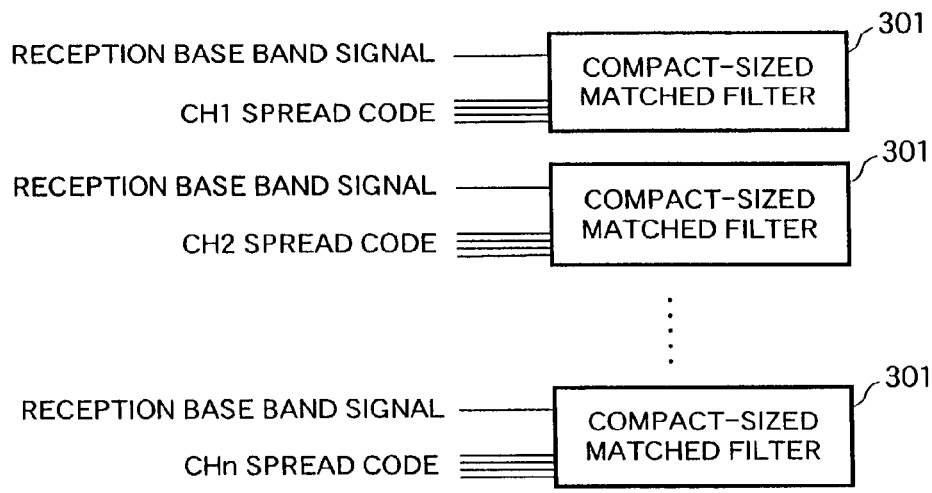
FIG. 5 is a schematic block diagram showing a configuration example showing an arrangement of parallelly-connected compact-sized matched filters.
FIG. 6 is a table showing an example of a channel allocation performed in the W-CDMA wireless base station.

FIG. 5 is a schematic block diagram showing a configuration example showing an arrangement of parallelly-connected compact-sized matched filters. Since the number of taps of the matched filter can be covered by a size of several tenth of the preamble detection section when the preamble detection and path search section 300 as shown in FIG. 1 functions as the path search section, the compact-sized matched filters 301 are arranged to be parallelly connected as shown in FIG. 5. To signal inputs of the compact-sized matched filters 301 are parallelly inputted branched reception base band signals. On the other hand, to reference inputs of the compact-sized matched filters 301 are inputted spread codes for acquiring mutually different channels. As a result, the compact-sized matched filters 301 thus constructed output correlation values for different channels.

The following description is provided to explain an operation of the control section 320 for changing the allocated numbers of DPCH's and RACH's depending on the expropriated number of DPCH's. In a conventional art, parameters from the network 330 are also determined on the assumption that the numbers of receivable RACH's and DPCH's (the number of RACH's and DPCH's that can be received) are fixed. Also, a circuit for the maximum number of DPCH's and a circuit for the maximum number of RACH's are separately provided. Thus, this preferred embodiment comprises a circuit arrangement covering the number of entire channels (RACH's+DPCH's) so as to efficiently processing a packet communication by using the RACH which is large in variation regarding an amount of communications but large in the number of channels and to efficiently processing a data communication by using the DPCH which is small in the number of channels but large in an amount of communications.

More specifically, as the number of expropriated DPCH's increases, the allocated number of RACH's decreases so as to increase the allocated number of DPCH's. The RACH is used for the packet communication when the traffic is small. If the allocated number of receivable RACH's is increased while the number of expropriated DPCH's is being small, it is possible to sufficiently address a large number of people who have come by a carriage at a time.

On the contrary, when the DPCH occurs for a high-speed communication, the number of the entire channels is decreased so that the allocated number of receivable DPCH's is decreased. In this preferred embodiment, the number of RACH's for the packet communications is also decreased in addition to the decrease in the allocated number of receivable DPCH's.

Here, a method for allocating channels will be described with reference to FIG. 6 as follows. FIG. 6 is a table showing an example of a channel allocation performed in the W-CDMA wireless base station according to the present invention. The control section 320 determines the number of channels to be receivable depending on the number of DPCH's received from the external network 330. This determination is done using the table shown in FIG. 6 for example. In the event that the current number of DPCH's is 20, the control section 320 determines, according to the table of FIG. 6, the number of receivable RACH's to be 12 and the number of receivable DPCH's to be 22 inclusive of the current number of DPCH's. Based on this determination, the channel allocation will be performed. In addition, since the RACH is required when the DPCH is established between a portable terminal and the wireless base station, the minimum number of RACH's is beforehand set so as not to become zero.

With the operations as described above, restrictions dependent on the W-CDMA wireless base station is eliminated so that the numbers of receivable RACH's and DPCH's can be handled as being changed flexibly. Also, a circuitry can be used as a dual-purpose circuitry such that a circuit scale can be reduced or, in some cases, the number of DSP's can be reduced.

The following description is provided to explain an operation of the control section 320 for optimize a window size for the path search depending on the number of expropriated channels.

Generally, the cause of expropriated channels being small or short of the number thereof is the case that it is important to secure a communication quality, e.g., the case there is present the DPCH performing a high-speed data communication. On the other hand, the cause of expropriated channels being large of the number thereof is the case that it is not so important as compared with the high-speed data communication to secure the communication quality, e.g., the case of the vocalized telephone conversation. Therefore, the window size is changed depending on the number of expropriated channels in this preferred embodiment. More specifically, when the expropriated channels is small in numbers, an accuracy of path tracing is enhanced by widening the window size of path search per channel in order to secure the communication quality. On the other hand, when the expropriated channels are large in numbers, it is possible to somewhat narrow the window size without causing any adverse influence because it is not necessary to secure the communication quality.

The control section 320 determines the optimized window size depending on the number of expropriated channels. Specifically, the value obtained by dividing the number of expropriated channels into the total window size is set as the maximum window size for each channel. For example, if the total window size is 400 chips and the maximum window size is 40 chips, the window size for the path search is 40 chips in the case of the number of expropriated channels being less than 10, 20 chips in the case of the number of expropriated channels being less than 20 channels and 10 chips in the case of the number of expropriated channels being less than 40 channels, respectively.

The change of the window size for the path search is realized by changing the number of compact-sized matched filters 301 serially connected as shown in FIG. 4. For example, in the event that one compact-sized matched filter 301 is composed of 4 chip window size, it is possible to realize the window size of 4 chips if a compact-sized matched filter 301 is singularly used, the window size of 8 chips if two compact-sized matched filters 301 serially connected are used and the window size of 12 chips if three compact-sized matched filters 301 serially connected are used, respectively. Here, the compact-sized matched filter 301 or the preamble detection and path search section 300 may be implemented either in software or hardware.

With the operations as described above, the window size of the path search can flexibly be changed depending on the number of expropriated channels.

The following description is provided to explain an operation of the control section 320 for optimize the number of fingers depending on the number of expropriated channels. Finger 311 used in this embodiment is similar configuration to that as shown in FIG. 13. When the number of expropriated channels is small in numbers, a high quality communication is quite likely to be performed so that the number of fingers which are combined (or synthesized) by using the RAKE is increased to secure the communication quality. On the other hand, when the number of expropriated channels is large in numbers, it is unnecessary to secure the communication quality so that the number of fingers which are combined by using the RAKE is decreased without causing any adverse influence.

The control section 320 determines the optimized number of fingers depending on the number of expropriated channels. Specifically, the value obtained by dividing the number of expropriated channels into the total number of fingers is set as the maximum number of fingers for each channel. For example, if the total number of fingers is 160 and the maximum number of fingers is 16, it is possible to combine 16 fingers as the number of fingers in the case of the number of expropriated channels being less than 10, 8 fingers as the number of fingers in the case of the number of expropriated channels being less than 20 and 4 fingers as the number of fingers in the case of the number of expropriated channels being less than 40, respectively. Here, the fingers 311 or the demodulation section 310 may be implemented either in software or hardware.

Figure 7:
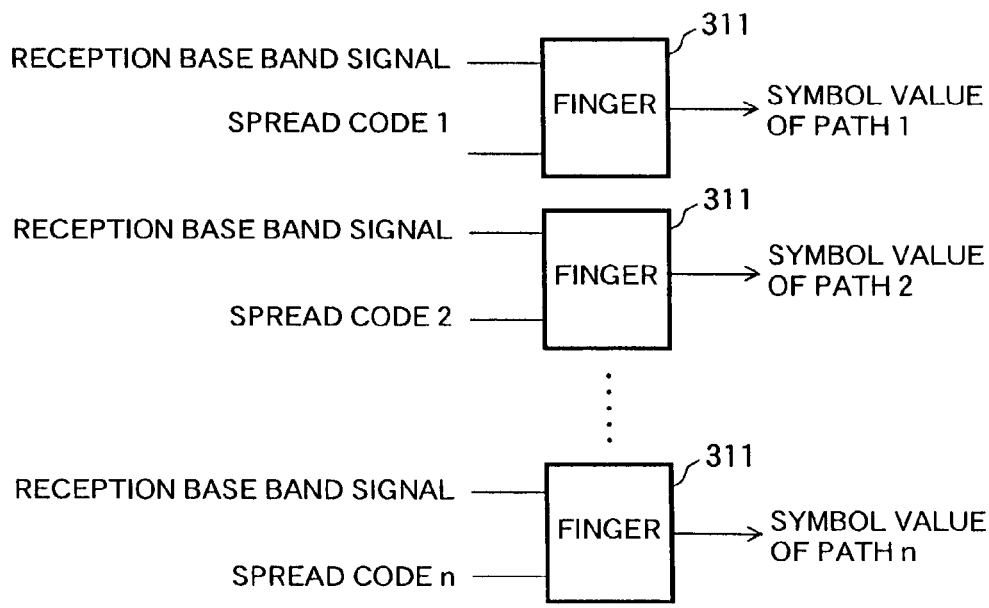
FIG. 7 is a schematic block diagram showing a configuration example for using a plurality of fingers in the same channel.

FIG. 7 is a schematic block diagram showing a configuration example for using a plurality of fingers in the same channel. According to an output from the path search section, a spread code is inputted to each of fingers 311 in a timing of its corresponding path. Then, each of the fingers 311 performs a correlative operation of the inputted spread code and the reception base band signal. As a result, symbols of a multi-path are reversely spread, respectively, and then a plurality of reverse-spread results corresponding to the multi-path are outputted to the RAKE section 312.

Figure 8:
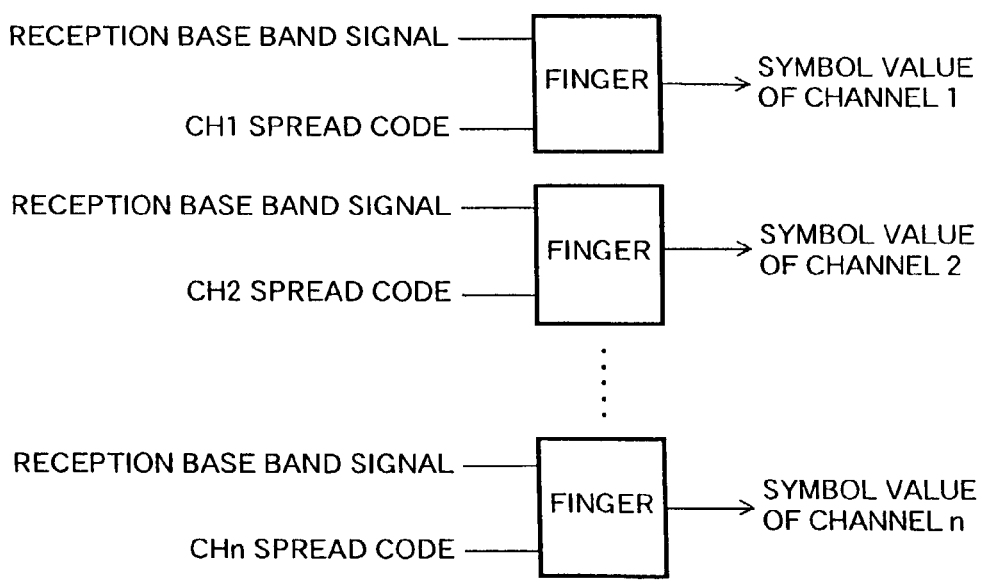
FIG. 8 is a schematic block diagram showing a configuration example by which a plurality of fingers are used in different channels.

On the other hand, FIG. 8 is a schematic block diagram showing a configuration example by which a plurality of fingers are used in different channels. According to an output from the path search section, a spread code of the corresponding channel is inputted to each of the fingers 311. Then, each of the fingers 311 performs a correlative operation of the inputted spread code and the reception base band signal. As a result, respective symbols corresponding to a plurality of channels are reversely spread and then each of the reverse spread results, i.e., one path for each channel, are outputted to the RAKE section 312 of its corresponding channel.

With the operations described above, the demodulation section 310 can efficiently be configured by a small hardware, simplified in configuration and downsized.

As described above, the preferred embodiment according to the present invention has been applied to the W-CDMA wireless base station. However, the present invention is not intended to be limited to the W-CDMA base station. Needless to say, the present invention can be applied to all of stations employing the CDMA mode wherein the preamble detection and the path search are performed.

Hereinbefore, the configuration of the CDMA wireless base station according to the present invention can meet various specifications over a wide range and enables the allocated numbers of RACH's and DPCH's to dynamically change depending on the cell radius and the number of Signatures. In addition, the compact-sized matched filters and the fingers are each switchable efficiently and each usable for dual-purpose, thereby enabling their associated circuitries to be substantially downsized.

For example, if the cell radius is large, it allows only one wireless base station to meet various specifications over a wide range by restricting the available number of Signatures and reducing the number of expropriated channels. FIG. 9 is a table showing a specification example of a channel allocation performed in the W-CDMA wireless base station of the preferred embodiment according to the present invention. The conventional channel allocation as shown in FIG. 14 is used for a fixed specification, but the channel allocation according to the present invention can meet various specifications over a wide range. For example, as shown in FIG. 9, if it is assumed as the reference that the cell radius is 15 Km, the number of Signatures is 12 and the maximum number of DPCH's is 32, the number of Signatures is 8 and the maximum number of DPCH's is 24 both in the case of the cell radius being 50 Km and the number of Signatures is 16 and the maximum number of DPCH's is 32 both in the case of the cell radius being 1 Km. Therefore, even if the W-CDMA wireless base station is designed with the cell radius of 15 Km as the reference, it is possible to meet the cell radius up to 50 Km with a certain restriction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A CDMA wireless base station that performs a channel allocation based on parameters externally received, characterized by comprising:
   a preamble detection and path search section adapted to perform a preamble detection in a reception base band signal or perform a path search of the reception base band signal;
   demodulating means for demodulating the reception base band signal; and
   controlling means for controlling said preamble detection and path search section so as to function either as a preamble detection section or as a path search section, wherein said preamble detection and path search section comprises a plurality of matched filters, in the event that said controlling means controlling said preamble detection and path search section to function as the preamble detection section said plurality of matched filters being connected serially, and in the event that said controlling means controlling said preamble detection and path search section to function as the path search section said plurality of matched filters are each used to acquire different channel from other.

* * * * *